US008966436B2

United States Patent
Pryhuber

(10) Patent No.: US 8,966,436 B2
(45) Date of Patent: Feb. 24, 2015

(54) SYSTEMS AND METHODS FOR PROVIDING AND CUSTOMIZING A VIRTUAL EVENT PLATFORM

(75) Inventor: Jeff Pryhuber, Lake Zurich, IL (US)

(73) Assignee: INXPO, Inc., Chicago, IL (US)

( * ) Notice: Subject to any disclaimer, the term of this patent is extended or adjusted under 35 U.S.C. 154(b) by 28 days.

(21) Appl. No.: 13/275,200

(22) Filed: Oct. 17, 2011

(65) Prior Publication Data

US 2012/0272208 A1      Oct. 25, 2012

Related U.S. Application Data

(60) Provisional application No. 61/393,540, filed on Oct. 15, 2010.

(51) Int. Cl.
*G06F 9/44* (2006.01)
*G06Q 10/10* (2012.01)
*G06F 9/445* (2006.01)

(52) U.S. Cl.
CPC ............ *G06Q 10/10* (2013.01); *G06F 9/44505* (2013.01)
USPC .............................. 717/104; 717/120; 717/121

(58) Field of Classification Search
None
See application file for complete search history.

(56) References Cited

U.S. PATENT DOCUMENTS

| 5,604,680 | A * | 2/1997 | Bamji et al. ................. 716/118 |
| 6,415,095 | B1 * | 7/2002 | Morishima et al. ........... 386/281 |
| 7,134,133 | B1 * | 11/2006 | Wugofski ....................... 725/39 |
| 7,574,381 | B1 * | 8/2009 | Lin-Hendel .................. 705/26.9 |
| 7,596,523 | B2 * | 9/2009 | Sobel et al. .................. 705/36 R |
| 7,797,261 | B2 * | 9/2010 | Yang .............................. 706/45 |
| 7,899,719 | B2 * | 3/2011 | Lin-Hendel ................... 705/27.2 |
| 8,196,032 | B2 * | 6/2012 | Hua et al. ....................... 715/202 |
| 8,307,331 | B2 * | 11/2012 | Warila et al. .................. 717/109 |
| 8,360,835 | B2 * | 1/2013 | Strause et al. ...................... 463/7 |
| 8,510,145 | B2 * | 8/2013 | Rowland .................... 705/7.13 |
| 8,725,650 | B2 * | 5/2014 | Mowatt et al. ................. 705/59 |
| 2001/0011326 | A1 * | 8/2001 | Yoshikawa et al. .......... 711/119 |
| 2002/0038451 | A1 * | 3/2002 | Tanner et al. ................. 717/105 |
| 2002/0062403 | A1 * | 5/2002 | Burnett et al. ................ 709/318 |
| 2004/0036721 | A1 * | 2/2004 | Anderson et al. ............. 345/848 |
| 2004/0104935 | A1 * | 6/2004 | Williamson et al. ......... 345/757 |
| 2004/0143602 | A1 * | 7/2004 | Ruiz et al. .................. 707/104.1 |
| 2004/0267694 | A1 * | 12/2004 | Sakai et al. ....................... 707/1 |
| 2005/0201623 | A1 * | 9/2005 | Jang et al. ..................... 382/232 |
| 2007/0083425 | A1 * | 4/2007 | Cousineau et al. ............. 705/14 |
| 2007/0101267 | A1 * | 5/2007 | Hua et al. ...................... 715/721 |
| 2007/0234284 | A1 * | 10/2007 | Tanner et al. ................. 717/109 |
| 2008/0072261 | A1 * | 3/2008 | Ralston et al. ................. 725/62 |
| 2008/0082311 | A1 * | 4/2008 | Meijer et al. ................... 703/24 |
| 2008/0091662 | A1 * | 4/2008 | Franke ............................. 707/3 |
| 2008/0120558 | A1 * | 5/2008 | Nathan et al. ................. 715/764 |
| 2008/0163317 | A1 * | 7/2008 | Mills .............................. 725/109 |

(Continued)

FOREIGN PATENT DOCUMENTS

WO    WO 2010013894 A2 *    2/2010    ............ A63G 31/16

*Primary Examiner* — Don Wong
*Assistant Examiner* — Roberto E Luna
(74) *Attorney, Agent, or Firm* — Polsinelli PC

(57) ABSTRACT

Systems and methods for customizing the functionalities and content of virtual event platform are disclosed. Content is received from a user using a template. Within the template the user defines and/or implements calls to an application programming interface to access various functionalities existing within the virtual event platform, as well as system variables exposed by the existing virtual event platform. The user uses the API system variables to define the customizations.

19 Claims, 4 Drawing Sheets

(56) References Cited

U.S. PATENT DOCUMENTS

| | | | |
|---|---|---|---|
| 2008/0201196 A1* | 8/2008 | Rowland | 705/9 |
| 2008/0216094 A1* | 9/2008 | Anderson et al. | 719/318 |
| 2008/0282263 A1* | 11/2008 | Song et al. | 719/318 |
| 2008/0300937 A1* | 12/2008 | Allen et al. | 705/7 |
| 2009/0063995 A1* | 3/2009 | Baron et al. | 715/753 |
| 2009/0149233 A1* | 6/2009 | Strause et al. | 463/7 |
| 2009/0210858 A1* | 8/2009 | Son et al. | 717/121 |
| 2009/0307611 A1* | 12/2009 | Riley | 715/757 |
| 2010/0005009 A1* | 1/2010 | Lin-Hendel | 705/27 |
| 2010/0037206 A1* | 2/2010 | Larimore et al. | 717/109 |
| 2010/0070460 A1* | 3/2010 | Furst et al. | 707/602 |
| 2010/0130296 A1* | 5/2010 | Ackley et al. | 472/61 |
| 2010/0169795 A1* | 7/2010 | Hyndman et al. | 715/757 |
| 2011/0022970 A1* | 1/2011 | Sobol et al. | 715/757 |
| 2011/0055730 A1* | 3/2011 | Caswell et al. | 715/753 |
| 2011/0055927 A1* | 3/2011 | Hamilton et al. | 726/26 |
| 2011/0082008 A1* | 4/2011 | Cheung et al. | 482/8 |
| 2011/0086711 A1* | 4/2011 | Dunko et al. | 463/41 |
| 2011/0107239 A1* | 5/2011 | Adoni et al. | 715/757 |
| 2011/0154247 A1* | 6/2011 | Chakra et al. | 715/780 |
| 2011/0246182 A1* | 10/2011 | Allen | 704/9 |
| 2012/0272208 A1* | 10/2012 | Pryhuber | 717/104 |

\* cited by examiner

US 8,966,436 B2

SYSTEMS AND METHODS FOR PROVIDING AND CUSTOMIZING A VIRTUAL EVENT PLATFORM

RELATED APPLICATIONS

The present non-provisional utility application claims priority under 35 U.S.C. §119(e) to provisional application No. 61/393,540 titled "Systems and Methods for Providing and Customizing a Virtual Event Platform," filed on Oct. 15, 2011, and which is hereby incorporated by reference herein.

FIELD OF INVENTION

Aspects of the present disclosure relate to virtual event platforms, and in particular, to methods and systems for customizing a virtual event platform.

BACKGROUND

Virtual event platforms have become a common method for creating and providing interactive content, in the form of customized virtual events, to a large audience over the Internet, both in real time and on-demand. For example, a university may create a virtual student orientation event in which university administrators offer introductory speeches and related content to students; a business enterprise may design a virtual event introducing new employees to the company; and/or a retail organization may design an interactive virtual event allowing customers to learn about the various products it offers for sale.

While the use of virtual event platforms has become more popular, current developmental processes used to customize existing virtual event platforms to generate custom virtual events may be time consuming and labor intensive, and often require highly skilled development teams. Moreover, many virtual event platforms are implemented to present only static content, resulting in monotonous and limited user experiences. It is with these observations in mind, among others, that various aspects of the present disclosure where developed.

SUMMARY

Aspects of the present disclosure include a method for customizing a virtual event platform. The method includes receiving a template at a virtual event platform system, the template comprising code defining customizations for a virtual event platform. The method further includes parsing the template to identify template content. The method includes modifying functionality of the virtual event platform based on the template content to generate custom functionality for the virtual event platform.

In another aspect, a system for customizing a virtual event platform is disclosed. The system includes at least one processor. The system includes an application programming interface and a template application comprising modules executable by the processor. The modules of the template application include a template retrieval module to receive a template at a virtual event platform system and a template parser module to: parse the template to identify template content and modify functionality of the virtual event platform based on the template content to generate custom functionality for the virtual event platform.

In yet another aspect, a computer-readable medium encoded with a template application comprising modules executable by a processor is disclosed. The modules include a template retrieval module to receive a template at a virtual event platform system and a template parser module to: parse the template to identify template content and modify functionality of the virtual event platform based on the template content to generate custom functionality for the virtual event platform.

BRIEF DESCRIPTION OF THE FIGURES

The foregoing and other objects, features, and advantages of the inventive concepts set forth herein will be apparent from the following description of particular embodiments of those inventive concepts, as illustrated in the accompanying drawings in which like reference characters refer to the same parts throughout the different views. The drawings are not necessarily to scale; emphasis instead being placed on illustrating the principles of the inventive concepts.

DETAILED DESCRIPTION

Figure 1:
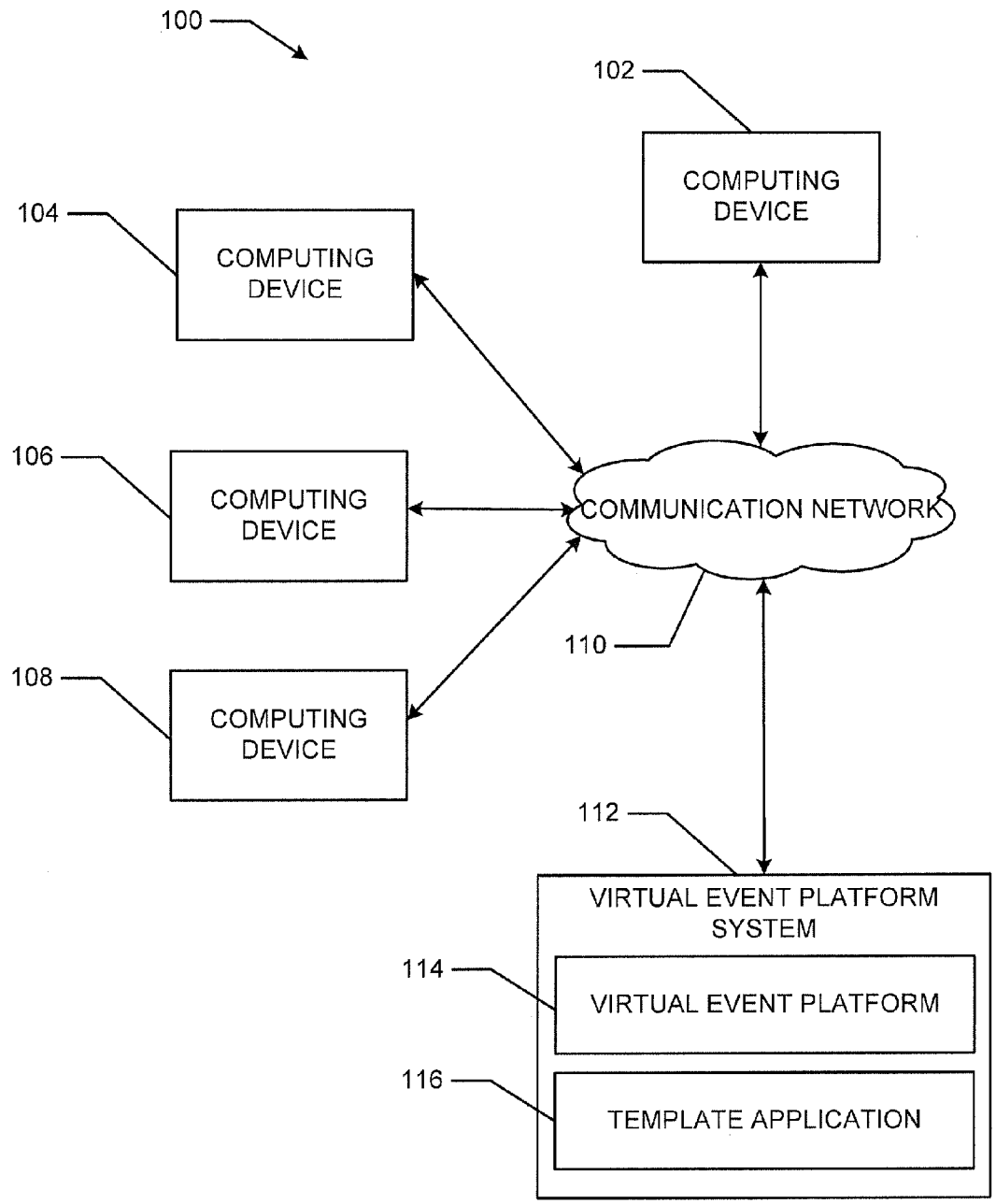
FIG. 1 is a block diagram of a computing environment for implementing a virtual event platform system in accordance with an embodiment of the present disclosure.

Various aspects of the present disclosure relate to systems to a virtual event platform and methods for customizing the virtual event platform ("VEP") to integrate multimedia and/or web related content and functionalities. In particular, methods and systems are described that provide customers, interested in creating customized virtual events, the ability to access data and functions within the VEP and use such access to integrate new content, such as interactive, multimedia, and/or web related content. Customers may make such customizations to the VEP without requiring original VEP developers to continuously modify existing VEP code and/or implement additional VEP code.

Generally speaking, a virtual event platform is a virtual framework, software architecture, environment, and/or platform that facilitates communication, business development, and networking opportunities between businesses in a virtual environment. In particular, VEPs allow businesses and other entities to create privately-branded virtual events that showcase their products and services, and institutions. The virtual events simulate a physical presence in virtual places similar to the real world, such as trade shows, business conventions, conferences, sales meetings, etc. In various aspects, a VEP may offer the ability to create virtual booths, show floors/rooms, custom navigation capabilities, webcasts, other communication functionalities, and the like, all of which may be used to create virtual trade shows, virtual business conventions, and/or other virtual events. Typically, a VEP uses a communication network, such as the Internet, to connect the virtual events to large audiences. For example, an automotive company may develop a virtual event accessible over the Internet that highlights various automobiles, the automotive industry, and the company's automotive products.

Often, when a virtual event is developed for a particular customer, such as a corporate entity, it is implemented by a sophisticated development team based on content received from the customer. The content is provided in a particular format, or in compliance with a particular standard enabling the development team to integrate the content within the VEP. Additionally, many VEP developers require the content be in a static format, since static content may be easier to integrate into an existing VEP. For example, a large corporation may provide developers with company logos, color templates, employee data, text, etc., in an XML format, all of which may be used by the developers in conjunction with the VEP to create a virtual event. Alternatively, the development team may implement additional VEP code and/or alter existing VEP code to integrate the content received from the customer. Both of these types of development processes may be time consuming, and require constant communication between customers, the development team, and any other parties responsible for the content of the virtual event. Furthermore, any real-time changes made to an existing virtual event may be more difficult to manage and track, and may result in delay and confusion among users. Various aspects of the present disclosure provide systems and methods for allowing customers to provide interactive and dynamic content and customizations that may be integrated into an existing virtual event platform (VEP) without requiring the original developers of the VEP to continuously modify and/or update the VEP code.

FIG. 1 illustrates an example operating environment allowing customers to provide customized multimedia and/or web related content that may be embedded into an existing virtual event platform. The operating environment includes multiple computing devices 102-108. Each client computing device 102-108 may be a computing or processing device, such as a personal computer, a server computer, a mobile processing device, and/or the like. Each computing device 102-108 may include one or more processors that process software or other machine-readable instructions and memory to store the software or other machine-readable instructions and data. The memory may include volatile and/or non-volatile memory. Each computing device 102-108 may also include a communication system to communicate via wireline and/or wireless communications, such as through the Internet, an intranet, an Ethernet network, a wireline network, a wireless network, and/or another communication network. In one aspect, each computing device 102-108 may include a display (not shown), such as a computer monitor, for viewing data, and an input device (not shown) such as a keyboard or a pointing device (e.g., a mouse, trackball, pen, touch pad, or other device), for entering data. The client computing devices 102-108 may be used by a corresponding user to retrieve data from and/or supply data to the VEPS 112.

Each computing device 102-108 may communicate with a virtual event platform system (VEPS) 112 over a communication network 110. The communication network 110 can be the Internet, an Intranet, or another communication network. For example, the VEPS 112 and the computing devices 102-108 may communicate data over the communication network using a Hyper Text Transfer Protocol ("HTTP") and/or another communication protocol. In another aspect, the client computing devices 102-108 may communicate with the VEPS 112 through separate communication networks. For example, some of the computing devices 102-108 may communicate with the VEPS 112 through the Internet, while other client computing devices may communicate with the VEPS 112 through a local area network.

In one example implementation, each computing device 102-108 represents a client customer of a VEPS provider requiring access to the various functionalities and data of a VEP for customization and virtual event generation. An administrator representing the customer uses, for example, the computing device 102 to generate a template request to transmit to the VEPS 112. The VEPS 112 transmits a template to display at the computing device 102 in response to the template request. The administrator then uses, for example, the keyboard associated with the computing device 102 to interact with the template to enter and define desired features, customizations, and/or content. For example, the administrator may embed video content into the template. Once the administrator has defined such features, customizations, and/or content, the administrator uses the input device of the computing device 102 to transmit the template to the VEPS 112.

The VEPS 112 is a virtual event platform system that provides a customer with the ability to generate customized virtual events by accessing and/or modifying the existing functionalities of a VEP 114. In various embodiments, a customer uses templates to provide customization content, such as multimedia content, web content, and/or other related content to the VEPS 112. Customization content may be any type of multimedia data, web data, image data, interactive data, and the like, capable of being incorporated into the VEP 114. For example, customization content may include: video, images, multimedia web pages, video games, applications, text, audio, etc. It is contemplated that any type of interactive content may be integrated into an existing VEP 114 through the VEPS 112.

The VEPS 112 executes a template application 116 that receives and processes the templates comprising the customer defined customizations, and uses the templates to modify the functionality of the VEP 114. The modified VEP 114 may subsequently be used to generate customized virtual events for the customer. For example, the VEPS 112 may receive interactive web videos from a corporate entity and integrate the interactive videos into the VEP 114 to generate interactive virtual events. In one aspect, the VEPS 112 allows customers to provide templates that access and modify existing functionality of the VEP 114 in real-time.

While FIG. 1 illustrates one example computing environment for implementing aspects of the present disclosure, it is contemplated that the VEPS 112 and its various software and/or hardware components may be implemented in other computing environments. For example, the VEPS 112 may be implemented in a cloud computing environment. Cloud computing is a type of computing in which dynamically scalable and typically virtualized resources are provided as services via the Internet. As a result, users need not, and typically do not, possess knowledge of, expertise in, or control over the technology and/or infrastructure implemented in the cloud. Accordingly, the various aspects and functionalities of the VEPS 112 and the VEP 114 may be provided and/or accessed through a cloud computing environment. For example, the VEPS 112 and the VEP 114 may be the equivalent of a cloud computing provider, delivering access to its various functionalities (e.g., virtual events) and data to users over the internet, while such functionalities and data are stored on servers at a remote location. Moreover, any virtual events generated by the VEPS 112 and/or the VEP 114 may be implemented, hosted, and/or executed in clouds and/or within a cloud computing environment.

Figure 2:
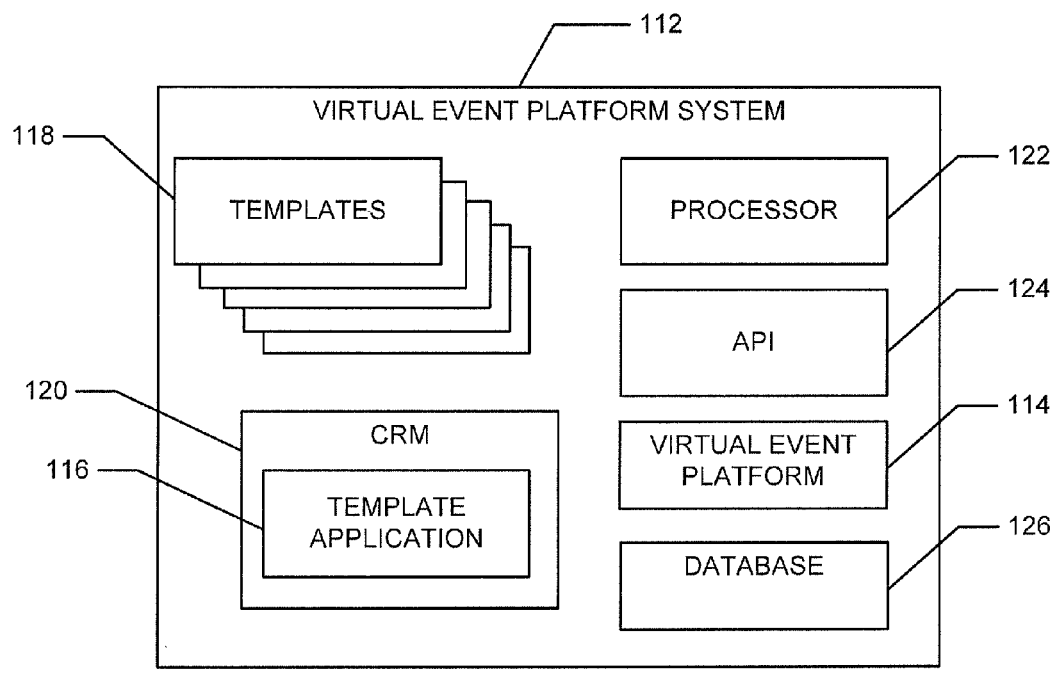
FIG. 2 is a block diagram of a virtual event platform system in accordance with an embodiment of the present disclosure.

FIG. 2 illustrates the relationship of hardware and/or software components operating within the VEPS 112 that may implement various aspects of the present disclosure. According to one aspect, the VEPS 112 includes a processor 122 that executes a template application 116 to enable a user to access the various functionalities, infrastructures, and software components within the VEP 114 using one or more templates. The processor may include memory as well as other computing components and may reside on a computer, or other processing system.

The VEP 114 is a virtual event platform that allows for dynamic, real-time, customization of the VEP 114 components, data, and functionalities to generate new and/or modified virtual events. For example, the VEP 114 may include functionality related to: virtual booths; text and video chat; video conferencing; message forums; surveys; virtual event management; web pages; group chat with moderated, scheduled, private and public formats and audio and/or video webcasts. Other functionalities may also be included. While the VEPS 112 depicted in FIG. 2 includes a VEP 114, in some embodiments, it is contemplated that the VEPS 112 may not include the VEP 114 within the system, and rather, communicates with an external VEP.

According to one aspect of the present disclosure, the VEPS 112 may include one or more templates. A template represents a standardized file type used by computer software as a pre-formatted example on which to base other files, especially documents. A template may also involve any processing element that can be combined with a data model and processed by a template engine to produce a result document. Templates may be created by including custom and/or system tags, which are references to subroutines, data, and processor directives in HTML. Templates may include other web-related content using other web protocols such as XML, flash, javascript, or any other web technology. In yet another aspect, the templates may include different types of content and functionality commonly found in interactive media and websites such as video media, interactive media, audio media, image media, multimedia, interactive game media, game media, and any other web publishable media.

The VEPS 112 may include a plurality of pre-stored templates comprising HTML formatting code, text, fields, and other formulas that correspond to the available features and options in the VEP 114. The templates may be accessed by users at the computing devices 102-108. Each template may access and expose data and/or replacement variables from databases (or not) which may include fields, forms, views, text, formulas, and profiles that enable customization of the standard features and options of the VEP 114. For example, the templates may be used in conjunction with virtual booth building functionality in the VEP 112 to create customized virtual booths. In one aspect, the templates can be used to implement custom spaces, custom graphics, custom behaviors, and custom renderings of standard items within the VEP 114. Alternatively, the templates may allow for easy integration with third party technologies and reporting, such as back-end reporting.

In yet another aspect, templates may be used to access existing functionality and content offered by the VEP 114. The templates may be used to customize existing VEP 114 functionality, or to create new functionality and customization content. The templates may be stored in a database 126. According to one aspect, database 126 is a general repository of data including but not limited to template data, customized content data, and other data relating to customizing an existing virtual event platform. Besides memory, the database 126 may include memory and one or more processors or processing systems to receive, process, query and transmit communications and store and retrieve data. In another aspect, the database 318 may be a database server.

The VEPS 112 may include an application programming interface ("API") 124 to facilitate interaction between the templates and the VEP 114. Generally speaking, an API is an interface implemented in software code that defines a particular set of rules and specifications that software programs can follow to communicate with other, different, software programs. Alternatively, the API 124 may be defined as a description of the way one piece of software asks another program to perform a service. In one aspect, the API 124 may be a client-side API. The API 124 may be accessed through function calls in a template, which allows communication with the VEP 114 and the API 124. In another aspect, the API 124 provides access to the underlying functionality of the VEP 114 without revealing internal proprietary details of the VEP 114.

As an example, the API 124 may be a collection of commands or functions which enable a user access to functions and services of the VEP 114. A user may obtain access to the VEP 114 by calling the API 124 functions or commands in a computer source code, computer program, markup text, or text file. In one aspect, a user can make API 124 function calls in a one or more of the templates 118. For example, the API 124 function calls may be made via javascript and/or ajax calls from user-supplied code in a template. The VEP 114 modules and/or functions a user may access through API 124 function calls may include: message board system, user and profile information, user preferences system, webcast system, video chat, blog system, banner advertising system, online statistical system, dashboard system, chat room system, administrative information system, and user authorization system. Other modules and functionalities may also be accessed within the VEP 114 using the API 124 function calls and it is contemplated that any functionality provided by the VEP 114 may be accessed using API 124 function calls. In another aspect, a user may make API 124 function calls within a template to integrate external software components and/or systems with existing functionality of the VEP 114.

A template application 116, executable by the processor 122, may be used to provide a customer access to one or more of the templates 118. For example, the template application 116 may transmit or otherwise provide the computing devices 102-108 access to a template. Subsequently, the customer may implement additional functionality, or access the VEP 114 functionality and content through the template using HTML, or some other web-based coding technology. The template application 116 processes the additional functionality and/or content to customize the VEP 114.

The VEPS 112 may include a computer readable media ("CRM") 120 configured with and/or storing executable instructions to implement the template application 116. The CRM 120 may include computer storage media, communication media, and/or another available medium that can be accessed by the processor 122. By way of example and not limitation, computer storage media includes memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system. Generally, program modules include routines, programs, objects, components, data structures, etc., that perform particular tasks or implement particular abstract data types.

Figure 3:
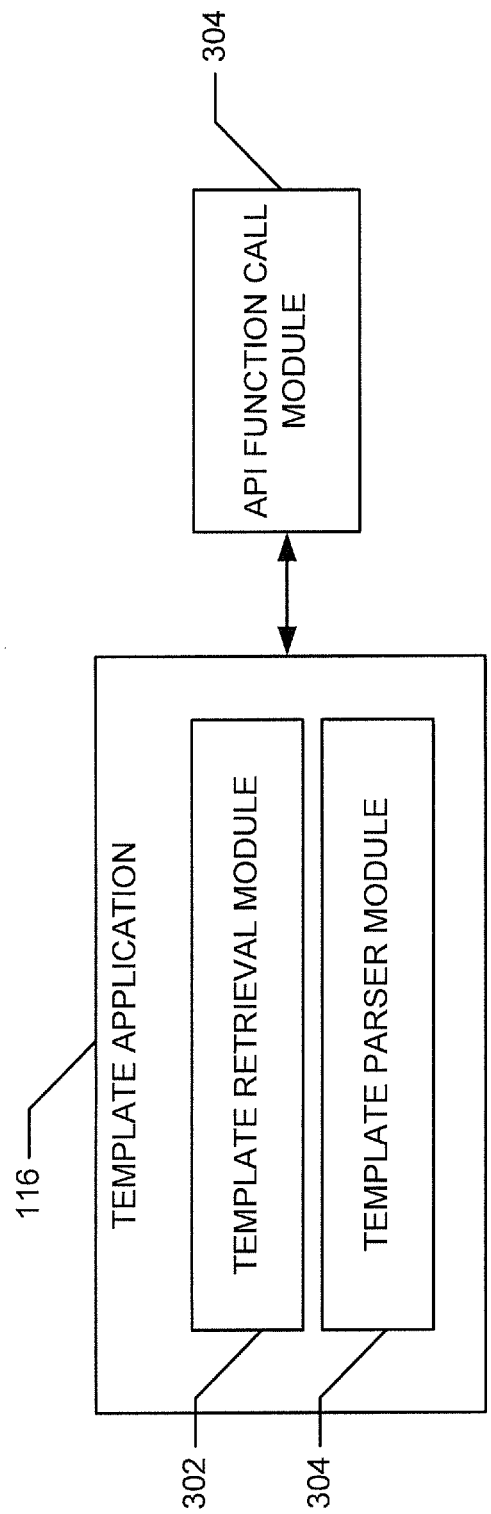
FIG. 3 is a block diagram of a template application, in accordance with an embodiment of the present disclosure.

FIG. 3 is a block diagram that depicts various modules within the template application 116 according to one embodiment of the present disclosure. A template retrieval module 302 retrieves a template from the VEPS 112 and provides the template to a computing device (e.g., the computing devices 102-108). For example, a template may be stored in the VEPS 112 with a corresponding template name. Subsequently, using the administrative tool, the user may access and/or query the template by name and have the template automatically recognized. Once the template has been retrieved and provided to the computing device, the user may access the template to select standard functionality, features, and options using an input device at the computing device. In another aspect, the user at the computing device may access the template to customize and/or create new functionalities, features, and content to include within a particular pre-existing portion of the VEP 114.

An API function call module 304 allows a user, at a client computing device, to access the API 124 to create custom spaces, functionality, and content within the VEP 114. The API function module 304 allows a user to define API function calls within a template to access the underlying data and functionality of the VEP 114 without revealing internal proprietary details of the VEP 114. For example, the VEP 114 may have pre-existing virtual booth functionality and standard virtual booth designs. A corporate user may define and/or make one or more API functions calls within a template to access and customize the existing virtual booth functionality to include a new virtual booth features specifically catered to the corporate users business. In one aspect, any functionality in the VEP 114 that is accessible through the API may be customizable.

A template parser module 306 receives a completed template from a client computing device and processes the template and the template data to implement the user's customized functionality and content. The template parser module 306 processes the template to identify template content. Template content refers to any content added to the template by a user. For example, template content may be one or more template and/or system variables comprising data and/or customized content defined by a user. In one aspect, the template/system variables are a set of dynamic named values that expose the current data and functionalities of a VEP; the variables may be accessed to customize, extend, and or modify the exposed data and functionalities of the VEP. In another aspect, the template content may be one or more API function calls that a user defined in a template that links to customized content. The template parser module 306 may process the template data and/or API functions calls into the existing VEP functionality and content to create new customizations. For example, a customer may include an API function call that links a customer's existing business videos with existing VEP virtual booth functionalities in a template. The template parser module 304 will process the API function call to integrate the business video within the existing VEP functionality. Subsequently, a virtual booth event capable of displaying the custom business videos may be generated by the VEP. In one aspect, the template parser module 306 may process the template using mail merge. Mail merge involves a merge function describing the production of multiple documents from a single template form and a structured data source. For example, the template parser module 306 may parse the received template and replace any of the VEP 114 standard system tags found in the template with actual data and/or data values from the VEP 114.

In another aspect, the template parser module 306 may process, any data parsed from the template, and any newly created functionality parsed from the template to create displayable content. Displayable content may be in the form of visual content and/or interactive content, and may include video, audio, images, text, and the like. For example, displayable content may include HTML directives that were added in the template by a user. The content may be displayed at a user computing device or any other computing device and/or networking device capable of accessing the VEP and/or the VEPS. Such devices may include a computer via a web browser, a mobile computing device, and any other computing system with a display. Processing the template may include intermixing existing standard functionality and content of the VEP 114 with newly customized functionalities and content implemented in the template by a user.

Figure 4:
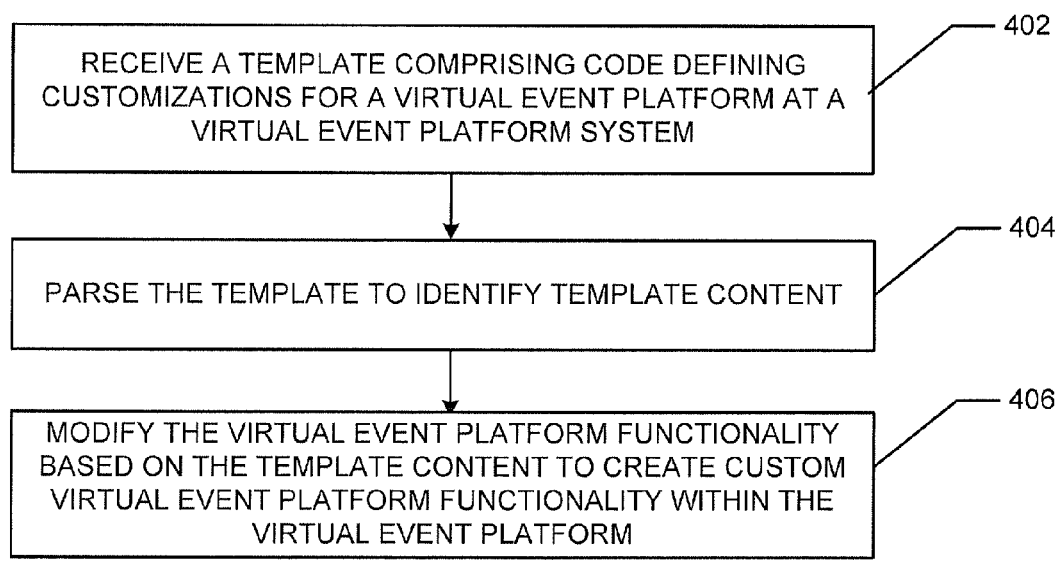
FIG. 4 is a method diagram illustrating an example method for customizing a virtual event platform, in accordance with an embodiment of the present disclosure.

FIG. 4 is a flow chart illustrating an example method for customizing VEP functionalities using a template. To begin, at operation 402, a template comprising code defining customizations for a virtual event platform is received. For example, a customer sends a request from the computing device 102 to the VEPS 112 requesting a template. In response, the VEPS 112 sends a template to the computing device 102. The customer, defines one or more customizations within the template, and transmits the template back to the VEPS 112. At 404, the template is parsed to identify template content. For example, the VEPS 112 executes a template application 116 that parses the template received from the customer to identify one or more system variables and/or one or more API function calls within the template. At 406, the virtual event platform functionality is modified based on the template content to create custom virtual event platform functionality within the virtual event platform. Referring to the previous example, the one or more system variables and/or one or more API function calls parsed from the template are integrated within the existing virtual event platform functionality, allowing the customer to generate virtual booths with access to the businesses private videos.

Thus, as described in various aspects and embodiments, systems and methods for customizing the functionalities and content of a VEP are disclosed. Information is received from a customer through a template. The template defines and/or implements calls to an application programming interface, as well as system variables exposed by the existing virtual event platform, to define the customizations for the VEP.

The VEPS 112, VEP 114, API 124 and the like may be realized in hardware, software or a combination of hardware and software. The modules discussed herein may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that when being loaded and executed, controls the computer system such that it carries out the systems, modules, and methods described herein.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for customizing a virtual event platform, the method comprising:
   receiving a template at a virtual event platform system configured to generate an interactive virtual event for presenting a multimedia content to one or more users, the virtual event virtually simulating at least a portion of a real-world event in which the one or more users are participating, the template comprising code defining customizations for the virtual event platform;
   parsing the template to identify template content comprising the multimedia content;
   modifying functionality of the virtual event platform system based on the multimedia content to generate custom virtual booth functionality within the virtual event platform system by:
      defining an application programming interface call within the template to access the functionality of the virtual event platform system; and
      modifying the functionality to generate the custom virtual booth functionality; and
   generating the interactive virtual event by:
      executing the custom virtual booth functionality to generate a virtual booth corresponding to the at least the portion of the real-world event.

2. The method of claim 1, wherein:
   the template includes one or more system variables exposing the functionality in the virtual event platform system; and
   the method further comprising integrating the multimedia content into the exposed function to generate the custom virtual booth functionality.

3. The method of claim 1, further comprising using the application programming interface call to integrate the multimedia content into the functionality to generate the custom virtual booth functionality.

4. The method of claim 2, wherein the multimedia content is included in the template in conjunction with the code, the multimedia content received from a client device displaying the template.

5. The method of claim 2, wherein the multimedia content comprises interactive content.

6. The method of claim 1, wherein the real-world event is a live convention and wherein the virtual booth simulates a physical booth at the live convention.

7. The method of claim 1, wherein defining the application programming interface call within the template to access the virtual event platform system does not reveal an internal detail of the virtual event platform system.

8. A system for customizing a virtual event platform comprising:
   at least one processor;
   a template application comprising modules executable by the processor, the modules comprising:
      a template retrieval module to receive a template at a virtual event platform system configured to generate an interactive virtual event for presenting multimedia content to one or more users, the virtual event virtually simulating at least a portion of a real-world event in which the one or more users are participating, the template comprising code defining customizations for the virtual event platform;
      a template parser module to:
         parse the template to identify template content comprising the multimedia content; and
         modify functionality of the virtual event platform system based on the multimedia content to generate custom virtual booth functionality within the virtual event platform system by:
            defining an application programming interface call within the template to access the functionality of the virtual event platform system; and
            modifying the functionality to generate the custom virtual booth functionality; and
      generating the interactive virtual event by:
         executing the custom virtual booth functionality to generate a virtual booth corresponding to the at least the portion of the real-world event.

9. The system of claim 8, wherein:
   the template content includes one or more system variables exposing the functionality in the virtual event platform; and
   the method further comprising integrating multimedia content into the exposed function to generate the custom virtual booth functionality.

10. The system of claim 8, further comprising using the application programming interface call to integrate the multimedia content into the functionality to generate the custom virtual booth functionality.

11. The system of claim 9, wherein the multimedia content is included in the template in conjunction with the code, the multimedia content received from a client device displaying the template.

12. The system of claim 9, wherein the multimedia content comprises interactive content.

13. The system of claim 8, wherein the real-world event is a live convention and wherein the virtual booth simulates a physical booth at the live convention.

14. The system of claim 8, wherein defining the application programming interface call within the template to access the virtual event platform system does not reveal an internal detail of the virtual event platform system.

15. A non-transitory computer-readable medium encoded with instructions executable by a processor, the instructions comprising:
receiving a template at a virtual event platform system configured to generate an interactive virtual event for presenting multimedia content to one or more users, the virtual event virtually simulating at least a portion of a real-world event in which the one or more users are participating, the template comprising code defining customizations for the virtual event platform;
parsing the template to identify template content comprising the multimedia content;
modifying functionality of the virtual event platform system based on the multimedia content to generate custom virtual booth functionality within the virtual event platform system by:
defining an application programming interface call within the template to access the functionality of the virtual event platform system; and
modifying the functionality to generate the custom virtual booth functionality; and
generating the interactive virtual event by:
executing the custom virtual booth functionality to generate a virtual booth corresponding to the at least the portion of the real-world event.

16. The non-transitory computer-readable medium of claim 15, wherein:
the template content includes one or more system variables exposing the functionality in the virtual event platform; and
the method further comprising integrating multimedia content into the exposed function to generate the custom virtual booth functionality.

17. The non-transitory computer-readable medium of claim 15, further comprising using the application programming interface call to integrate the multimedia content into the functionality to generate the custom virtual booth functionality.

18. The non-transitory computer-readable medium of claim 15, wherein the real-world event is a live convention and wherein the virtual booth simulates a physical booth at the live convention.

19. The non-transitory computer-readable medium of claim 15, wherein defining the application programming interface call within the template to access the virtual event platform system does not reveal an internal detail of the virtual event platform system.

* * * * *